(12) United States Patent
Ericson et al.

(10) Patent No.: US 11,767,169 B2
(45) Date of Patent: Sep. 26, 2023

(54) WAREHOUSING SYSTEMS AND METHODS

(71) Applicant: Target Brands, Inc., Minneapolis, MN (US)

(72) Inventors: Brian Ericson, Minneapolis, MN (US); Matthew Anderson, Minneapolis, MN (US); Adam Keyser, Minneapolis, MN (US); Ashley Crowe, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 370 days.

(21) Appl. No.: 17/083,960

(22) Filed: Oct. 29, 2020

(65) Prior Publication Data
US 2022/0135333 A1    May 5, 2022

(51) Int. Cl.
*B65G 1/137*    (2006.01)

(52) U.S. Cl.
CPC .................. *B65G 1/1376* (2013.01)

(58) Field of Classification Search
None
See application file for complete search history.

(56) References Cited

U.S. PATENT DOCUMENTS

| | | | | |
|---|---|---|---|---|
| 3,968,893 A | * | 7/1976 | Lapham | B65G 1/04 180/14.1 |
| 5,475,604 A | * | 12/1995 | Nagamatsu | B65G 1/1371 414/788.9 |
| 5,501,571 A | * | 3/1996 | Van Durrett | B65G 61/00 414/21 |
| 5,908,283 A | * | 6/1999 | Huang | B65G 61/00 414/21 |
| 9,142,035 B1 | | 9/2015 | Rotman et al. | |
| 9,315,344 B1 | * | 4/2016 | Lehmann | B65B 59/001 |
| 10,810,534 B2 | * | 10/2020 | Taylor | G06Q 50/28 |
| 2009/0179072 A1 | * | 7/2009 | Szesko | G16H 20/13 235/375 |
| 2011/0074057 A1 | * | 3/2011 | Lee | B29C 51/22 198/803.14 |
| 2017/0039304 A1 | * | 2/2017 | Kim | G06Q 10/08 |
| 2017/0091704 A1 | * | 3/2017 | Wolf | G06Q 10/087 |
| 2019/0193956 A1 | | 6/2019 | Morland et al. | |
| 2020/0122927 A1 | * | 4/2020 | Bellar | G05D 1/0297 |

* cited by examiner

*Primary Examiner* — Timothy R Waggoner
(74) *Attorney, Agent, or Firm* — Fish & Richardson P.C.

(57) ABSTRACT

Warehouse automation and methods of controlling material flow can be used to enhance the efficiencies of warehouse operations. For example, automation systems and methods can be used to efficiently optimize the storage density of items in warehouses. In some examples, warehouse workers are automatically provided with instructions for how to assemble pallet loads of incoming items to a height that is determined based on the goal of fully utilizing open warehouse storage rack spaces. In some examples, a plan for optimizing the build-height of pallet loads of an incoming shipment is determined in advance of receiving the shipment.

20 Claims, 2 Drawing Sheets

WAREHOUSING SYSTEMS AND METHODS

TECHNICAL FIELD

This document relates to systems and methods for enhancing the efficiencies of warehouse operations. For example, this document relates to automation systems and methods for efficiently optimizing the storage density of items in warehouses.

BACKGROUND

The use of warehouse automation is an effective way to increase the efficiency of warehouse operations, and to thereby more efficiently support business functions such as ecommerce and order fulfillment processes. The goals of warehouse automation include the efficient use of space resources, and the elimination of manual steps of the order fulfillment process and to optimize the efficiency of order fulfillment processes. Warehouse automation technology is useful for multiple reasons, such as, to make material handling processes more efficient, to utilize space efficiently, and to help reduce the occurrences of human error.

SUMMARY

This document describes systems and methods for enhancing the efficiencies of warehouse operations. For example, this document describes automation systems and methods for efficiently optimizing the storage density of items in warehouses. As described below, this document describes systems and methods to optimize the unloading of trailers and to prepare its contents for storage in a warehouse by building storage-dense pallet loads. In some examples, warehouse workers are automatically provided with instructions for how to assemble pallet loads of items to a height that is determined based on the goal of fully utilizing open warehouse storage rack spaces.

In one aspect, this disclosure is directed to a system for handling an incoming shipment of items. The system can include an automated conveyance system, an automated scanning system, and a control system. The automated conveyance system can include a main conveyor and multiple branch conveyors. The main conveyor can be configured to transport items and to transfer the items onto the multiple branch conveyors. The automated scanning system can be arranged to scan items being transported on the main conveyor. The control system can comprise one or more hardware processors and computer memory. The control system can be in data communication with the conveyance system and the scanning system. The control system can be programmed and operable to: (i) access or receive first information indicating types and quantities of items in an incoming shipment to be received at a future date; (ii) access or receive second information indicating sizes of the items; (iii) access or receive third information that specifies target heights for pallet loads of the items; and (iv) use the first, second, and third information to determine, prior to the future date, a plan for assembling the pallet loads of the items.

Such a system for handling an incoming shipment of items may optionally include one or more of the following features. In some embodiments, the control system is programmed and operable to assign a particular type of item of the items to a particular branch conveyor of the multiple branch conveyors. The control system can also be programmed and operable to cause the conveyance system to transfer the particular type of item from the main conveyor to the particular branch conveyor. In some embodiments, the scanning system is configured and operable to scan barcode information on the items being transported on the main conveyor and to communicate the barcode information to the control system. The control system can be programmed and operable to correlate the particular type of item to the barcode information. In some embodiments, the scanning system is configured and operable to scan the items being transported on the main conveyor to determine size information of the items and to communicate the size information to the control system. The control system can be programmed and operable to compare the size information to the second information to determine a size comparison. In some embodiments, the control system is programmed and operable to determine an updated plan for assembling the pallet loads of the items based on the size information and in response to the size comparison being greater than a threshold level. The system can also include one or more hand-held devices wirelessly in data communication with the control system. Each hand-held device can include a barcode scanner and can correspond to an individual branch conveyor of the branch conveyors. In some embodiments, the control system is programmed and operable to send instructions for how to assemble a pallet load of a particular item of the items to a particular hand-held device of the hand-held devices. The control system can be programmed and operable to send the instructions in response to receiving barcode information corresponding to the particular item from the particular hand-held device. The instructions can include a quantity of the particular items to be located on a single layer of a pallet. The instructions can include a total number of layers of the particular items to be located on the pallet. In some embodiments, each branch conveyor includes multiple designated pallet build locations. In such a case, the instructions can identify a particular designated pallet build location of the multiple designated pallet build locations.

This disclosure is also directed to a method for handling an incoming shipment of items. In some embodiments, the method includes (1) accessing or receiving by a control system comprising one or more hardware processors and computer memory: first information indicating types and quantities of items in an incoming shipment to be received at a future date; second information indicating sizes of the items; and third information that specifies target heights for pallet loads of the items, and (2) prior to the future date, determining, using the first, second, and third information, a plan for assembling the pallet loads of the items.

Such a method for handling an incoming shipment of items may optionally include one or more of the following features. The method may also include assigning, by the control system, a particular type of item of the items to a particular branch conveyor of an automated conveyance system having multiple branch conveyors and a main conveyor; and controlling, by the control system, the conveyance system to cause the conveyance system to transfer the particular type of item from the main conveyor to the particular branch conveyor. The method may also include (a) receiving, by the control system and from a scanning system that is configured and operable to scan the items being transported on the main conveyor, size information of the particular type of item; (b) comparing, by the control system, the size information to the second information to determine a size comparison; and (c) determining, by the control system, an updated plan for assembling the pallet loads of the items based on the size information and in response to the size comparison being greater than a threshold level. In some embodiments, the method also includes receiving, by the control system and from the scanning system, barcode information corresponding to the particular type of item; and correlating, by the control system, the particular type of item to the barcode information. The assigning the particular type of item to the particular branch conveyor may be performed in response to the receiving the barcode information. The method may also include wirelessly transmitting, by the control system and to a hand-held device comprising a barcode scanner, instructions for how to assemble a pallet load of a particular item of the items. In some embodiments, the control system wirelessly transmits the instructions in response to wirelessly receiving barcode information corresponding to the particular item from the hand-held device. The instructions may include a quantity of the particular items to be located on a single layer of a pallet. The instructions may include a total number of layers of the particular items to be located on the pallet. The instructions may identify a particular designated pallet build location of multiple designated pallet build locations.

The systems and processes described here may be used to provide one or more of the following optional benefits. First, inventory carrying costs can be reduced by the added efficiencies provided by the systems and processes described herein. Second, the accuracy of warehouse processes can be enhanced by eliminating human errors using the automated systems and processes described herein. Third, labor costs associated with material handling can be reduced using the automated systems and processes described herein. Fourth, warehouse space requirements can be reduced using the automated systems and processes described herein. Fifth, the systems and processes described herein have the goal to make the building of pallet loads efficient. The automation to get the case pack to the lane is quick, efficient, and eliminates human error and the use of multiple lanes (with multiple build points per lane), and ensures that the process of building pallets does not backup the unloading of the trailer. In contrast to other solutions, the systems and processes described herein will enable more efficient unloading and palletization of freight.

Other features, aspects and potential advantages will be apparent from the accompanying description and figures.

DESCRIPTION OF DRAWINGS

Like reference symbols in the various drawings indicate like elements

DETAILED DESCRIPTION

This document describes systems and methods for enhancing the efficiencies of warehouse operations. For example, this document describes automation systems and methods for efficiently optimizing the storage density of items in warehouses. In some examples, warehouse workers are automatically provided with instructions for how to assemble pallet loads of items to a height that is determined based on the goal of fully utilizing open warehouse storage rack spaces. Said another way, this document describes warehouse automation and methods of controlling material flow to streamline and to consolidate different types of material handling processes (which can include, for example, storage of items for orders for direct shipments to consumers, orders that are wholly or partly internal to the company such as a store replenishment orders, and others). In some embodiments described herein, an example method includes determining a plan for optimizing the build-height of pallet loads of an incoming shipment of items. The method includes automatically providing warehouse workers with instructions for assembling the pallet loads in accordance with the optimized plan.

Figure 1:
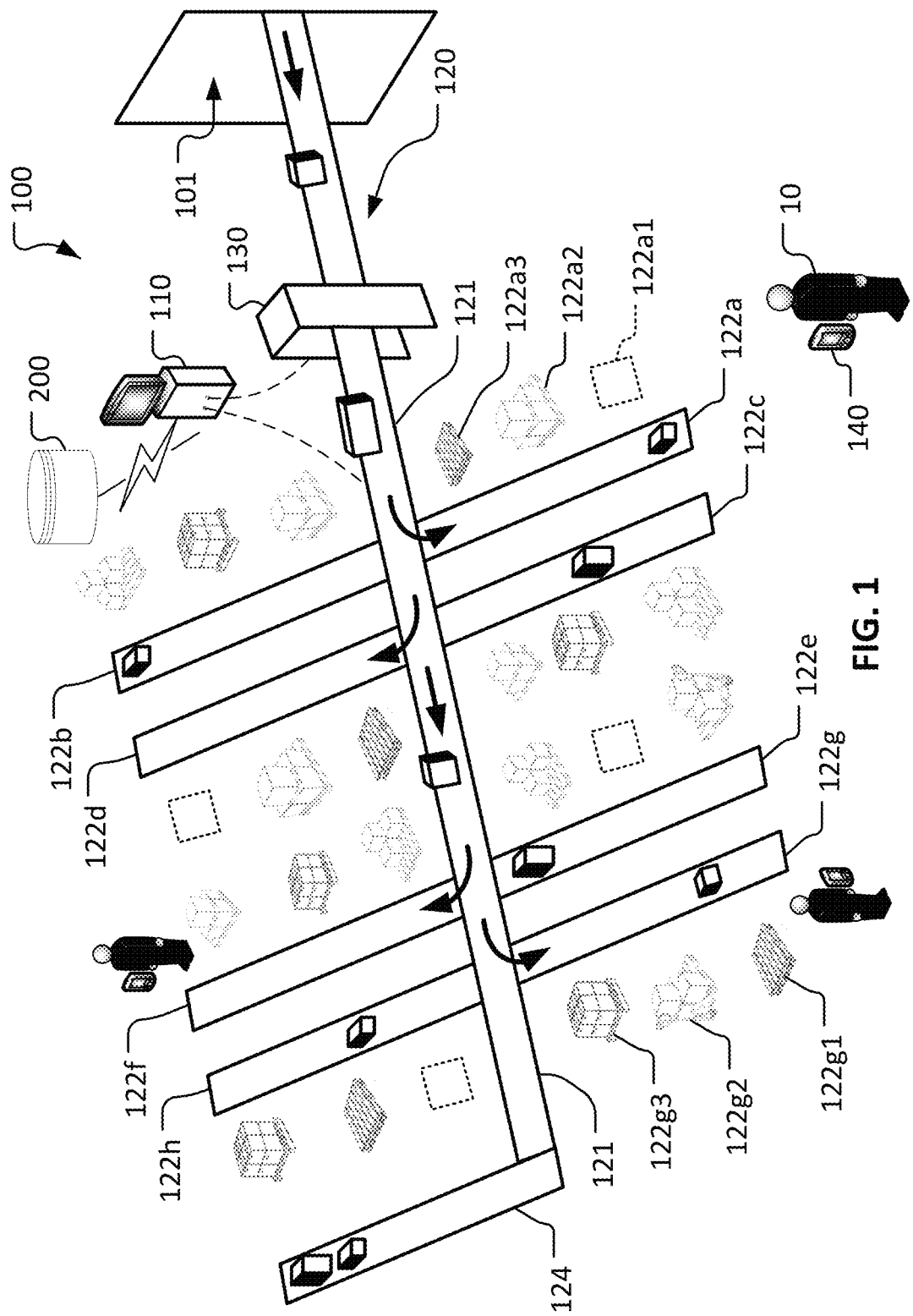
FIG. 1 is a simplified schematic diagram of an example system for assembling loads of items for storage in a space-efficient manner.

FIG. 1 depicts a simplified schematic diagram illustrating an example incoming material handling system 100. The incoming material handling system 100 includes a control system 110, an automated conveyance system 120, and an automated scanning system 130. In some embodiments, the incoming material handling system 100 also includes hand-held devices 140 that include a barcode scanner and a display for providing communications to warehouse workers 10.

The incoming material handling system 100 may take place at a variety of different types of facilities such as, but not limited to, flow centers, distribution centers, warehouses, inventory storing locations, order fulfillment centers, receive centers, stores, cross-docking facilities, material handling facilities, and the like, and combinations thereof. In this disclosure, the term "warehouse" may be used to refer to any and all such different types of facilities, and combinations thereof. In some examples, the incoming material handling system 100 takes place at a single facility. Alternatively, in some examples execution of the incoming material handling system 100 is distributed across two or more facilities. A warehouse as described herein can be a portion of a multi-echelon supply chain.

At a summary level, the function of the incoming material handling system 100 is to facilitate the transfer of individual boxes of incoming sellable items (e.g., boxes of products for retail sales and the like) from an incoming truck 101 to pallet loads (typically homogenous pallet loads, i.e., a single type of product stored on a pallet) for warehouse storage. As described further below, the function of the incoming material handling system 100 includes techniques by which the assembly of individual boxes of products to create pallet loads of the products (also known as "building a pallet") is performed so as to optimize the pallet-assembly or pallet-building process.

While "pallet loads" are used herein to describe the operations of the incoming material handling system 100, in some cases pallets are not used as the storage accommodation. That is, the items can be located in various types of storage accommodations such as racks, shelves, containers, vessels, carts, bins, totes, boxes, bags, and the like. Such storage accommodations can be individually identified, controlled, and tracked by the incoming material handling system 100.

The incoming material handling system 100 includes the control system 110. The control system 110 may be a single computer system, or may be a distributed system that includes a network of multiple individual computers. In some examples, the control system 110 may be in communication with, or be part of and/or may comprise a business management system 200 such as, but not limited to, an enterprise resource planning (ERP) system, a materials management system, an inventory management system, a warehouse management system, one or more automation control systems, and the like, and combinations thereof. Accordingly, the control system 110 can, in some cases, broadly encompass multiple systems that can be situated locally, remotely, or situated both locally and remotely. The control system 110 can include hardware, software, user-interfaces, and so on. For example, the control system 110 may include (or be in communication with) one or more computer systems, data storage devices, wired and/or wireless networks, control system software (e.g., programs, modules, drivers, etc.), user interfaces, scanners, communication modules, interfaces for control communications with robots, machine control systems, and the like. The control system 110 is at least in data communication with the automated conveyance system 120, the automated scanning system 130, and the hand-held devices 140.

The incoming material handling system 100 also includes the automated conveyance system 120. The conveyance system 120 (as depicted) is just one example of the types of conveyance systems that can be used as part of the incoming material handling system 100.

The purpose of the conveyance system 120 is to transport boxes of incoming items from a truck 101 (or other transportation/storage entity) to within the warehouse where pallet loads of the boxes can be assembled. While the term "box" or "item" are used herein to describe the operations of the incoming material handling system 100, other types of item containers can also be used (e.g., totes, cartons, bins, bags, etc.). While the depicted conveyance system 120 is depicted as being designed to receive items from a single truck 101, in some embodiments the conveyance system 120 can be designed to receive items from multiple trucks 101 (including, but not limited to, multiple trucks 101 simultaneously).

The non-limiting example conveyance system 120, as depicted, includes a main conveyor 121, multiple branch conveyors 122a, 122b, 122c, 122d, 122e, 122f, 122g, and 122h (or 122a-h collectively), and an optional reject conveyor 124. While eight branch conveyors 122a-h are depicted, the incoming material handling system 100 is scalable to include any desired number of the branch conveyors.

The branch conveyors 122a-h are arranged to receive items from the main conveyor 121. That is, items can be transferred from the main conveyor 121 to any one of the branch conveyors 122a-h in an automated manner (e.g., as controlled by the control system 110 and/or the controls of the conveyance system 120). Various types of conveyor system automation can be used to transfer items/boxes from the main conveyor 121 to the branch conveyor 122a-h (e.g., pop-up transfer, cross-belt transfer, tilt-tray transfer, shoe-transfer, etc.).

In the incoming material handling system 100, each of the branch conveyors 122a-h has one or more pallet build points. The pallet build points are designated areas near each of the branch conveyors 122a-h wherein the workers 10 can assemble pallet loads of items (usually homogenously).

In the depicted example, each of the branch conveyors 122a-h has three associated pallet build points. For example, the branch conveyor 122a has a first pallet build point 122a1, a second pallet build point 122a2, and a third pallet build point 122a3. Similarly, the branch conveyor 122g has a first pallet build point 122g1, a second pallet build point 122g2, and a third pallet build point 122g3.

While the depicted example includes three pallet build points for each of the branch conveyors 122a-h, the incoming material handling system 100 is scalable such that any desired number of pallet build points can be established for a branch conveyor. In some embodiments, such as the depicted embodiment, each of the branch conveyors 122a-h includes an equal number of pallet build points. In contrast, in some embodiments some of the branch conveyors 122a-h can have differing numbers of pallet build points.

As described further below, the control system 110 can provide instructions to the workers 10 via the hand-held devices 140 that include the designation of a particular pallet build point for a particular type of item that the worker 10 scanned using the hand-held device 140. In such a case the worker 10 can, in response to receiving the instructions, manually move such an item to the particular pallet build point that the control system 110 designated. Moreover, as described further below, the instructions from the control system 110 to the workers 10 via the hand-held devices 140 can also include instructions for how to build the pallet load of the particular type of item. Such instructions can include, for example, a number of the items to be placed on a layer of the pallet, and/or a number of layers of the items to be built on the pallet.

The conveyance system 120 also includes the reject conveyor 124. Items/boxes can be transferred from the main conveyor 121 to the reject conveyor 124 for various reasons. In some cases, items are transferred to the reject conveyor 124 when the item(s) are not expected to be in the shipment of items on the truck 101. In another example, items can be transferred the reject conveyor 124 when the item(s) are not planned for (e.g., more of the items than expected were received, and the like). The conveyance system 120 can optionally include sensors to confirm item transfers, detect item backups, and so on.

The incoming material handling system 100 also includes the scanning system 130. In some embodiments, the scanning system 130 is multi-functional in that it can scan incoming items on the main conveyor 121 to determine: (i) the items' one or more barcodes (e.g., identifying the type or SKU of the item, etc.) and/or (ii) the physical size of the items. For example, in some embodiments the scanning system 130 is a six-sided scanner. In some embodiments, two or more different types of scanners can make up the scanning system 130. In particular embodiments, the scanning system 130 can also determine the weights of items. In some embodiments, the scanning system 130 can apply a label comprising an identifier to be used by the control system 110. In some examples, the scanning system 130 can detect "this side up" indicators.

The scanning system 130 is in data communication with the control system 110. Accordingly, when items on the main conveyor 121 pass through the scanning system 130, the output(s) from the scanning system 130 (e.g., the barcode(s) of the items and/or the physical size of the items) is communicated to the control system 110. In that manner, the control system 110 can be aware of the types of items and the sizes of the items that are incoming from the truck 101.

The incoming material handling system 100 can also include the hand-held devices 140 (which may be wearable devices, portable devices, etc.). Such hand-held devices 140 wirelessly communication with the control system 110, and may include readers that can scan, receive, or otherwise detect marks or tags (e.g., bar codes, radio frequency identification (RFID) tags, etc.) on individual sellable items or collections of sellable items (e.g., cases and totes), and then communicate such information with the control system 110. The hand-held devices 140 are also be able to display information received from the control system 110. For example, as described further herein, the control system 110 can provide instructions for building pallets of items to the workers 10 by displaying such instructions on the hand-held devices 140. In some embodiments, the hand-held devices 140 can convey information to the worker visually, auditorily, and/or tactily.

Figure 2:
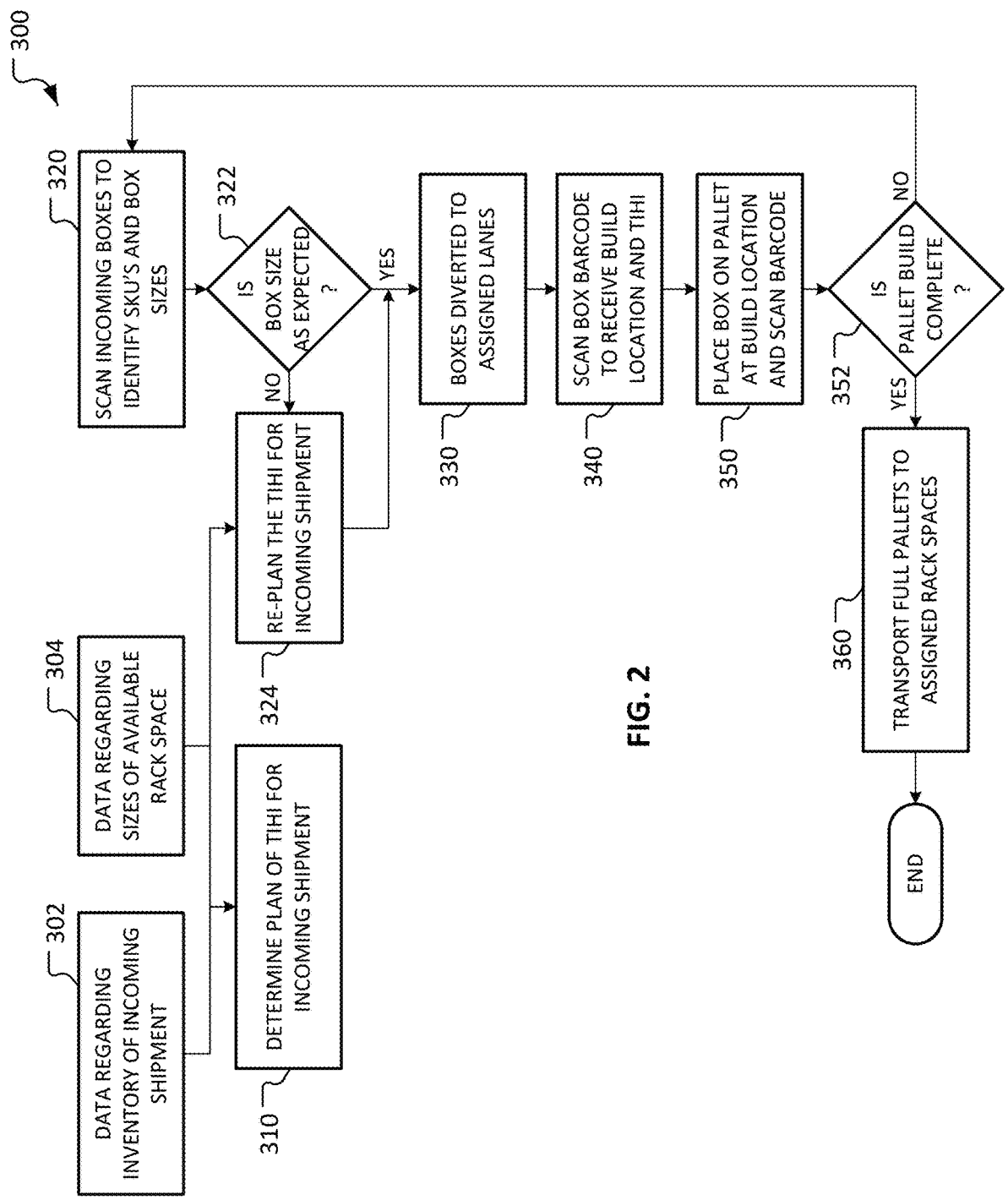
FIG. 2 is a flowchart of an example process of determining parameters for assembling loads of items for storage in a space-efficient manner, and for executing the process.

FIG. 2 depicts a flowchart of an example method for handling an incoming shipment of items 300 (or simply "method 300") in accordance with some embodiments described herein. It should be understood that any of the concepts, systems, methods, and contexts described above in reference to the incoming material handling system 100 can also analogously apply to the method 300. For example, while not specifically depicted in FIG. 2, it should be understood that the operations of the method 300 involve the use of the control system 110. As described above, the control system 100 can be situated locally, remotely situated, or both locally situated and remotely. Moreover, the control system 100 can include a network of multiple computers and/or control systems.

From an overview standpoint, the method 300 includes a planning portion and an execution portion. The planning portion can be performed prior to the execution portion. In other words, the planning can be performed prior to the arrival of a truck at a warehouse.

The planning portion includes the determination of instructions for pallet building of items that will be in a shipment of items to be received by a warehouse. Such instructions can include "TIHI" instructions. TIHI refers to the number of boxes/cartons/items stored on a layer, or tier, (the "TI") and the number of layers high that these will be stacked on the pallet (the "HI"). In some embodiments, the HI (the number of layers high that these will be stacked on the pallet) can be determined based on the physical dimensions of available warehouse rack storage spaces. That is, the HI can be determined so as to fully utilize, or optimize, the heights of available warehouse rack storage spaces. In that manner, the storage density of items in the warehouse can be increased or maximized in accordance with the plan determined during the planning portion of the method 300.

The planning portion includes steps 302, 304, and 310. Steps 302 and 304 are inputs to step 310. The plan is created in step 310. The planning portion can be executed by a control system, such as the control system 110 described above in reference to the example incoming material handling system 100 of FIG. 1.

In step 302, data regarding the inventory of an incoming shipment is provided to, or accessed by, the control system. In other words, the expected contents of an incoming shipment or delivery (e.g., a bill of lading or an inventory listing) is provided to, or accessed by, the control system. Such data includes the types of items in the incoming shipment and quantities of the types of the items. In some cases, the data may also indicate a quantity of items to be passed through the warehouse without first storing the items in the warehouse.

In step 304, data regarding sizes of available storage rack spaces is provided to, or accessed by, the control system. Such data includes, but is not limited to, the height of the available rack spaces. This data may take various forms. In some embodiments, default data, or estimated data is used. In some embodiments, the data can be generalized (e.g., small sized space, medium sized space, large sized space, or extra-large sized space). In some embodiments, actual dimensional data is used.

In step 310, the control system determines a plan for the incoming shipment. The plan is determined using the data from steps 302 and 304. The plan can include, but is not limited to, the desired TIHI for each of the incoming items and the warehouse rack spaces where the pallets of items built in accordance with the TIHI should be stored. This plan can be used during the execution portion of the method 300.

The execution portion of the method 300 starts at step 320. At step 320, an incoming truck has arrived at the warehouse and items are being unloaded from the truck and run through the scanning system. An example of this step is illustrated in FIG. 1, where items are transported along the main conveyor 121 through, or past, the scanning system 130. During this step, the scanning system reads/scans the barcode(s) on the item/box and ascertains the actual physical dimensions of the item/box. This information is communicated to the control system.

In step 322, the control system compares the actual physical dimensions of the item/box that were ascertained by the scanning system to stored, expected physical dimensions for that item/box. If the actual dimensions are the same as the expected dimensions, then the next step is step 330. If the actual dimensions are different than the expected dimensions, then the next step is step 324. In some embodiments, an adjustable threshold level is set/used such that if the actual dimensions are different than the expected dimensions by more than the threshold level, then the next step is step 324. However, if the actual dimensions are different than the expected dimensions by less than the threshold level (meaning that the actual dimensions are close to the expected dimensions), then the next step is step 330. In some embodiments, if the actual dimensions are different than the expected dimensions, it may be determined that dimensional differences indicate damage, and the item/box may be automatically rejected.

At step 324 (assuming the situation where the actual dimensions of an item are different than its expected dimensions, e.g., by more than the threshold level), the plan for that item may be revised. That is, in some embodiments the control system re-plans the TIHI for that item. In addition, the control system can store the actual dimensions of the item and used those dimensions for planning in the future.

At step 330, the items/boxes are transferred (e.g., directed, diverted, conveyed, flow, etc.) from the main conveyor to particular, assigned branch conveyors or lanes. The control system will determine which branch conveyors should be used for building a pallet or pallets of a particular item. Then, the control system will control the conveyance system to divert the items/boxes to their assigned branch conveyors.

At step 340, a worker scans the barcode of the item/box once the item/box is on the branch conveyor. For example, a worker 10 can use a hand-held device 140 (as described above in reference to FIG. 1) to perform this step. The data from the scan of the barcode is transmitted to the control system. The control system then knows that the worker is ready to move the item/box to an assigned pallet at a particular pallet build location associated with the branch conveyor. In response, the control system sends instructions to the hand-held device that was used to scan the item/box. The instructions can include: (i) the pallet build location to move the item/box to, (ii) the TIHI for the item/box. In some cases when a rack is used instead of a pallet, the instructions can include which level of the rack that the item/box should be placed on.

At step 350, the worker transports (e.g., carries) the item/box to the pallet build location in accordance with the instructions received in step 340. In addition, the worker places the item/box on the pallet in accordance with the TIHI instructions received in step 340. The worker also scans a bar code at the pallet build location to indicate that the step 350 had been completed. This information is communicated to the control system so the control system knows that the item/box has been placed on the pallet in accordance with the plan/instructions. In some embodiments, the worker may determine that the item/box should not be placed due to damage, or that the TIHI is not achievable and should be rejected. For example, one reason to reject a TIHI is that the plan assumed an orientation for the item/box that is not possible. Some embodiments may ask the worker which dimension of an item/box correlates to "up." Such information can be used for future planning.

At step 352, the control system determines whether the build of the pallet on which the worker placed the item/box in step 350 has been completed. If not (meaning there are still open spaces on the pallet for more items/boxes to be placed in accordance with the TIHI plan), then the control system takes no action and the method reverts to step 320. However, if the control system determines that the build of the pallet was completed by the placement of the item/box in step 350, then the control system send instructions to be displayed on the worker's hand-held device. The instructions can indicate that the pallet has been fully built (in accordance with the planned TIHI) and that the pallet is therefore ready to be transported to the warehouse racking for storage. In some embodiments, the particular assigned rack space can also be communicated.

At step 360, in response to the completion of a pallet build, the fully built pallet can be transferred to its assigned rack space in the warehouse. In some embodiments, the pallet (which was built to a particular height so as to substantially utilize the size of the assigned rack space) will occupy as much of the rack space's open volume as possible for the size of the particular items/boxes on the pallet.

The process 300 can be repeated for an entire trailer-load of items, until all items have been placed/stored or rejected.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

We claim:

1. A system for handling an incoming shipment of items, the system comprising:
    an automated conveyance system comprising: (i) a main conveyor, (ii) multiple branch conveyors, and (iii) a reject conveyor, wherein the main conveyor is configured to transport items and to transfer the items onto the multiple branch conveyors and the reject conveyor;
    an automated scanning system arranged to scan items being transported on the main conveyor; and
    a control system comprising one or more hardware processors and computer memory, the control system in data communication with the conveyance system and the scanning system, the control system programmed and operable to:
        access or receive first information indicating types and quantities of items in an incoming shipment to be received at a future date, wherein the types information comprises an SKU or barcode;
        access or receive second information indicating sizes of the items;
        access or receive third information that specifies target heights for pallet loads of the items, wherein the target heights for the pallet loads of the items are determined based on heights of available warehouse rack storage spaces in which the pallet loads of the items may be stored;
        use the first, second, and third information to determine, prior to the future date, a plan for assembling the pallet loads of the items;
        identify rejected items that are not one of the types or quantities of the items indicated in the first information; and
        control the automated conveyance system to transfer the rejected items from the main conveyor to the reject conveyor in response to the identification of the rejected items.

2. The system of claim 1, wherein the control system is programmed and operable to assign a particular type of item of the items to a particular branch conveyor of the multiple branch conveyors, and wherein the control system is programmed and operable to cause the conveyance system to transfer the particular type of item from the main conveyor to the particular branch conveyor.

3. The system of claim 2, wherein the scanning system is configured and operable to scan barcode information on the items being transported on the main conveyor and to communicate the barcode information to the control system, and wherein the control system is programmed and operable to correlate the particular type of item to the barcode information.

4. The system of claim 1, wherein the scanning system is configured and operable to scan the items being transported on the main conveyor to determine size information of the items and to communicate the size information to the control system, and wherein the control system is programmed and operable to compare the size information to the second information to determine a size comparison.

5. The system of claim 4, wherein the control system is programmed and operable to determine an updated plan for assembling the pallet loads of the items based on the size information and in response to the size comparison being greater than a threshold level.

6. The system of claim 1, further comprising hand-held devices wirelessly in data communication with the control system, each hand-held device including a barcode scanner and corresponding to an individual branch conveyor of the branch conveyors.

7. The system of claim 6, wherein the control system is programmed and operable to send the instructions for assembling the pallet load of the particular item of the items to a particular hand-held device of the hand-held devices.

8. The system of claim 7, wherein the control system is programmed and operable to send the instructions in response to receiving barcode information corresponding to the particular item from the particular hand-held device.

9. The system of claim 8, wherein the instructions include a quantity of the particular items to be located on a single layer of a pallet.

10. The system of claim 9, wherein the instructions include a total number of layers of the particular items to be located on the pallet.

11. The system of claim 7, wherein each branch conveyor includes multiple designated pallet build locations, and wherein the instructions identify a particular designated pallet build location of the multiple designated pallet build locations.

12. A method for handling an incoming shipment of items, the method comprising:
    accessing or receiving by a control system comprising one or more hardware processors and computer memory:
        first information indicating types and quantities of items in an incoming shipment to be received at a future date, wherein the types information comprises an SKU or barcode;
        second information indicating sizes of the items; and
        third information that specifies target heights for pallet loads of the items, wherein the target heights for the pallet loads of the items are determined based on heights of available warehouse rack storage spaces in which the pallet loads of the items may be stored;
    prior to the future date, determining by the control system, using the first, second, and third information, a plan for assembling the pallet loads of the items;
    identifying rejected items that are not one of the types or quantities of the items indicated in the first information; and
    controlling an automated conveyance system to transfer the rejected items from a main conveyor to a reject conveyor in response to the identification of the rejected items.

13. The method of claim 12, further comprising:
    assigning, by the control system, a particular type of item of the items to a particular branch conveyor of the automated conveyance system, wherein the automated conveyance system comprises: multiple branch conveyors, the reject conveyor, and the main conveyor; and
    controlling, by the control system, the conveyance system to cause the conveyance system to transfer the particular type of item from the main conveyor to the particular branch conveyor.

14. The method of claim 13, further comprising:
    receiving, by the control system and from a scanning system that is configured and operable to scan the items being transported on the main conveyor, size information of the particular type of item;
    comparing, by the control system, the size information to the second information to determine a size comparison; and
    determining, by the control system, an updated plan for assembling the pallet loads of the items based on the size information and in response to the size comparison being greater than a threshold level.

15. The method of claim 14, further comprising:
receiving, by the control system and from the scanning system, barcode information corresponding to the particular type of item; and
correlating, by the control system, the particular type of item to the barcode information,
wherein the assigning the particular type of item to the particular branch conveyor is performed in response to the receiving the barcode information.

16. The method of claim 12, further comprising:
wirelessly transmitting, by the control system and to a hand-held device comprising a barcode scanner, instructions for how to assemble a pallet load of a particular item of the items.

17. The method of claim 16, wherein the control system wirelessly transmits the instructions in response to wirelessly receiving barcode information corresponding to the particular item from the hand-held device.

18. The method of claim 16, wherein the instructions include a quantity of the particular items to be located on a single layer of a pallet.

19. The method of claim 18, wherein the instructions include a total number of layers of the particular items to be located on the pallet.

20. The method of claim 19, wherein the instructions identify a particular designated pallet build location of multiple designated pallet build locations.

\* \* \* \* \*